US00RE48055E

(19) United States
(12) Reissued Patent
Park et al.

(10) Patent Number: US RE48,055 E
(45) Date of Reissued Patent: Jun. 16, 2020

(54) METHOD AND APPARATUS FOR PROVIDING AND USING CONTENT ADVISORY INFORMATION ON INTERNET CONTENTS

(71) Applicant: SAMSUNG ELECTRONICS CO., LTD., Suwon-si (KR)

(72) Inventors: Jung-shin Park, Suwon-si (KR); Kwang-hyuk Kim, Suwon-si (KR); Sung-wook Ahn, Seoul (KR); Sung-wook Byun, Suwon-si (KR); Sang-woong Lee, Suwon-si (KR); Eun-Hee Rhim, Yongin-si (KR); O-hoon Kwon, Suwon-si (KR); Sung-jin Park, Suwon-si (KR); In-chul Hwang, Suwon-si (KR); Mun-jo Kim, Suwon-si (KR)

(73) Assignee: SAMSUNG ELECTRONICS CO., LTD., Suwon-si (KR)

(21) Appl. No.: 14/806,253

(22) Filed: Jul. 22, 2015

Related U.S. Patent Documents

Reissue of:
(64) Patent No.: 8,495,673
Issued: Jul. 23, 2013
Appl. No.: 12/272,106
Filed: Nov. 17, 2008

(30) Foreign Application Priority Data

May 13, 2008 (KR) ..... 10-2008-0044017

(51) Int. Cl.
*H04N 7/173* (2011.01)
*H04N 21/254* (2011.01)
(Continued)

(52) U.S. Cl.
CPC ..... *H04N 7/173* (2013.01); *H04N 21/2541* (2013.01); *H04N 21/4532* (2013.01);
(Continued)

(58) Field of Classification Search
CPC ..... H04N 7/173; H04N 21/2541; H04N 21/4532; H04N 21/45455; H04N 21/4751;
(Continued)

(56) References Cited

U.S. PATENT DOCUMENTS 5,878,233 A * 3/1999 Schloss ..... G06Q 20/10 705/39
6,212,329 B1 * 4/2001 Sugahara ..... G06F 21/10 360/60
(Continued)

FOREIGN PATENT DOCUMENTS

KR 1020050076788 A 7/2005
KR 1020060024224 A 3/2006
(Continued)

OTHER PUBLICATIONS

Communication dated Sep. 11, 2015, issued by the Korean Intellectual Property Office in counterpart Korean Application No. 10-2008-0044017.
(Continued)

*Primary Examiner* — Jalatee Worjloh
(74) *Attorney, Agent, or Firm* — Sughrue Mion, PLLC

(57) ABSTRACT

Provided are a method and apparatus for providing and using content advisory (CA) information on Internet contents. A method of providing CA information by using a CA information server, includes receiving a request for the CA information on a content, from an Internet Protocol television (IPTV); searching for CA information on the content; and transmitting the found CA information to the IPTV. A method of using CA information when an IPTV reproduces a content not having the CA information, according to the present invention, includes transmitting a request for CA information, to a CA information server; receiving the CA
(Continued)

information from the CA information server; analyzing the CA information; and applying the CA information.

37 Claims, 9 Drawing Sheets

(51) Int. Cl.
*H04N 21/84* (2011.01)
*H04N 21/4545* (2011.01)
*H04N 21/475* (2011.01)
*H04N 21/45* (2011.01)

(52) U.S. Cl.
CPC ... *H04N 21/45455* (2013.01); *H04N 21/4751* (2013.01); *H04N 21/4755* (2013.01); *H04N 21/84* (2013.01); *G06F 2221/2149* (2013.01)

(58) Field of Classification Search
CPC ..... H04N 21/4755; H04N 21/84; G06F 2221/2149
USPC ..... 725/28
See application file for complete search history.

(56) References Cited

U.S. PATENT DOCUMENTS 7,697,791 B1 * 4/2010 Chan ..... G06Q 30/02 382/305
7,953,079 B2 * 5/2011 John ..... H04H 60/23 370/389
8,131,763 B2 * 3/2012 Tuscano ..... G06F 17/30867 707/783
8,150,875 B1 * 4/2012 Dubrovsky ..... G06F 7/00 707/783
9,716,914 B1 * 7/2017 McCarty ..... H04N 21/454
2003/0051238 A1 * 3/2003 Barone, Jr. ..... 725/32
2004/0261099 A1 * 12/2004 Durden ..... H04N 7/163 725/32
2005/0160458 A1 6/2005 Baumgartner
2006/0056808 A1 3/2006 Yun
2006/0064716 A1 * 3/2006 Sull et al. ..... 725/37
2007/0180488 A1 * 8/2007 Walter ..... H04N 5/783 725/135
2007/0192184 A1 * 8/2007 Cai ..... G06Q 10/06 705/14.6
2008/0127241 A1 * 5/2008 Garcea ..... H04N 7/17318 725/24
2008/0133485 A1 * 6/2008 Yuen ..... H04N 21/816
2008/0196055 A1 * 8/2008 Sandoval ..... H04N 7/17318 725/25
2008/0256575 A1 * 10/2008 Raju et al. ..... 725/39
2008/0282309 A1 * 11/2008 Kim et al. ..... 725/117
2009/0104628 A1 * 4/2009 Reagan ..... C07K 16/18 435/7.4
2009/0178094 A1 * 7/2009 Thomas et al. ..... H04H 60/73 725/109
2010/0015956 A1 * 1/2010 Qu ..... H04N 7/163 455/414.1

FOREIGN PATENT DOCUMENTS

KR 1020060037043 A 5/2006
KR 1020060071173 A 6/2006

OTHER PUBLICATIONS

Communication dated Oct. 5, 2015, issued by the Korean Intellectual Property Office in counterpart Korean Application No. 10-2015-0106084.
Communication dated Apr. 20, 2016, issued by the Korean Intellectual Property Office in counterpart Korean Patent Application No. 10-2015-0106084.
Communication from the Korean Intellectual Property Office dated Oct. 28, 2014 in a counterpart Korean Application No. 10-2008-0044017.
Communication from the Korean Intellectual Property Office dated May 26, 2015 in a counterpart Korean Application No. 10-2008-0044017.

* cited by examiner

FIG. 9

```
<SegmentInformation
      segmentId="pgSegment1">
   <Description>
      <oif:ParentalGuide>
         PG-13
      </oif:ParentalGuide>
   </Description>
   <SegmentLocator>
      <MediaRelTimePoint>
         PT00H20M14S
      </MediaRelTimePoint>
      <MediaDuration>
         PT00H23M17S
      </MediaDuration>
   </SegmentLocator>
</SegmentInformation>
```

FIG. 10

```
<contentAdvisoryDescriptor>
<default>
<region="0x01">
<rating="G">                    50
</default>
<frame value="154" duration="94">
<phobia="snake">
</frame>
<frame value="364" duration="177">
<phobia="George W. Bush">
</frame>
</contentAdvisoryDescriptor>
                                60
```

METHOD AND APPARATUS FOR PROVIDING AND USING CONTENT ADVISORY INFORMATION ON INTERNET CONTENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 8,495,673, which was filed as U.S. patent application Ser. No. 12/272,106 on Nov. 17, 2008 and issued on Jul. 23, 2013, and which claims priority from Korean Patent Application No. 10-2008-0044017, filed on May 13, 2008 in the Korean Intellectual Property Office, the disclosure of which is incorporated herein by reference in its entirety.*

CROSS-REFERENCE TO RELATED PATENT APPLICATION

This application claims priority from Korean Patent Application No. 10-2008-0044017, filed on May 13, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to content advisory (CA) information on multimedia contents, and more particularly, to generating CA information on contents existing all over the Internet, and using the CA information.

2. Description of the Related Art

From the beginning of the 21$^{st}$ century, the fields of broadband broadcasting and data communication have been rapidly combining. Data communication service providers have competitively entered into the market of broadcasting and are making efforts to cross the boundary between broadcasting and data communication, and broadcasting service providers have been alerted against such occurrences and are making efforts to draw an Internet Protocol (IP)-based broadcasting market into their field.

No matter which side takes the upper hand, one definite fact is that people can now very easily access contents on the Internet, through a television (TV) in a living room. Conventionally, a typical TV is a very conservative device in comparison to a personal computer (PC). In general, a PC is used by an individual while the TV is shared by a whole family. Thus, conventional contents provided by TV broadcasting service providers are produced through self censorship and also viewing age ratings are determined in accordance with strict standards.

However, if Internet Protocol televisions (IPTVs) become popular, content providers will not be restricted to only broadcasting stations and all users using the Internet can provide self-produced contents (for example, user created contents (UCC)). Thus, it is obvious that the amount of contents that could be viewed through the TV will increase exponentially. However, a variety of contents on the Internet are produced without the censorship, and no one is appointed to determine their content advisory (CA) ratings.

Accordingly, when IPTVs become popular, a method of blocking harmful contents on the Internet will be regarded as a very important issue. Most existing CA standards have been formed on the basis of a conventional broadcasting environment and thus a new method of providing CA information is required in a new IPTV era.

FIG. 1 is a diagram illustrating a method of transmitting a broadcasting stream according to the Advanced Television Systems Committee (ATSC) standard that is one kind of terrestrial digital TV broadcasting standard.

Referring to FIG. 1, a head-end transmits a transport stream (TS) to a terminal. One TS includes a plurality of elementary streams (ESs). A program map table (PMT) includes information on each service unit (including one or more events) in an ES. A CA descriptor is linked to each PMT and this CA descriptor provides CA information (for example, a parental rating) of an event.

The CA information is preset in the terminal and thus, the terminal determines whether to allow viewing of a content by comparing the CA information included in the CA descriptor of the received TS, and the CA information that is preset in the terminal.

However, a conventional method of providing CA information requires a stream generator and can be applied only to certain types of broadcasting streaming (for example, ATSC streaming). Thus, if a content which exists on the Internet is arbitrarily downloaded and reproduced (for example, an IP-based steaming service), the conventional method may not be applied.

Also, conventional CA information is defined in units of events and thus a PMT has to be continuously updated in order to provide the CA information in more specified units (for example, in units of frames). Accordingly, the system may be prone to overload.

SUMMARY OF THE INVENTION

The present invention provides a method and apparatus for efficiently and reasonably providing CA information when contents on the Internet are viewed.

According to an aspect of the present invention, there is provided a method of providing CA information by using a CA information server, the method including receiving a request for CA information on a content, from an IPTV; searching for CA information on the content; and, transmitting the found CA information to the IPTV.

According to another aspect of the present invention, there is provided a method of using CA information when an IPTV reproduces a content not having CA information, the method including transmitting a request for CA information, to a CA information server; receiving the CA information from the CA information server; analyzing the CA information; and applying the CA information.

According to another aspect of the present invention, there is provided a CA information server including a CA information storage unit for storing CA information; a content identification (ID) analysis unit for analyzing an ID of a content requiring the CA information; and a CA information search unit for searching the CA information storage unit in order to obtain the CA information, by using the ID of the content, in accordance with a request of an Internet protocol television (IPTV).

According to another aspect of the present invention, there is provided a CA information management system including an Internet for providing multimedia contents; a CA information server for providing CA information on the multimedia contents; and an IPTV for controlling reproduction of the multimedia contents by using the CA information.

According to another aspect of the present invention, there is provided a computer readable recording medium having recorded thereon a computer program for executing a method of providing CA information by using a CA information server, the method including receiving a request for CA information on a content, from an IPTV; searching for CA information on the content; and transmitting the found CA information to the IPTV.

According to another aspect of the present invention, there is provided a computer readable recording medium having recorded thereon a computer program for executing a method of using CA information when an IPTV reproduces a content not having the CA information, the method including transmitting a request for CA information, to a CA information server; receiving the CA information from the CA information server; analyzing the CA information; and applying the CA information.

BRIEF DESCRIPTION OF THE DRAWINGS

The above and other aspects of the present invention will become more apparent by describing in detail exemplary embodiments thereof with reference to the attached drawings in which:

FIG. 9 is a diagram showing a broadband content guide (BCG) into which rating information, that is, a parental guide is inserted, as an example of CA information according to another exemplary embodiment of the present invention;

FIG. 10 is a diagram showing a CA descriptor for blocking reproduction of portions of a content, which correspond to phobias of the viewer, as an example of CA information according to another exemplary embodiment of the present invention.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
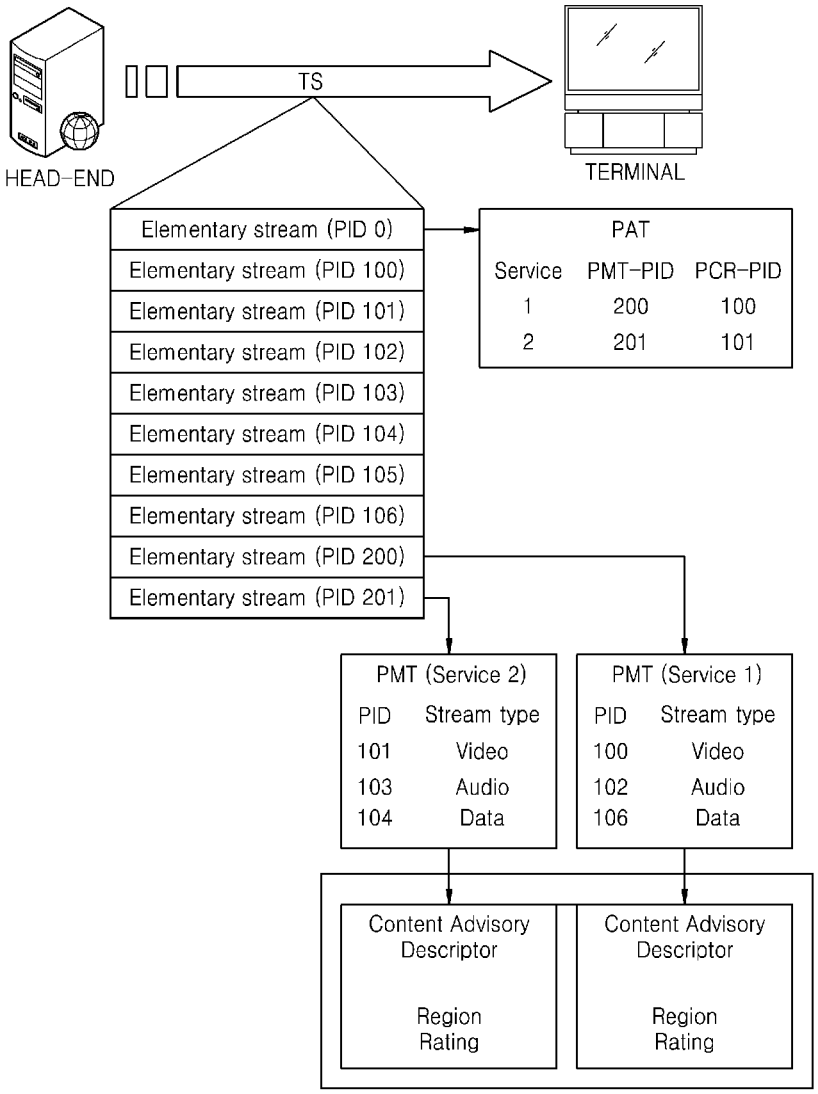
FIG. 1 (PRIOR ART)
FIG. 1 is a diagram illustrating a method of transmitting a broadcasting stream according to the ATSC standard.
Figure 2:
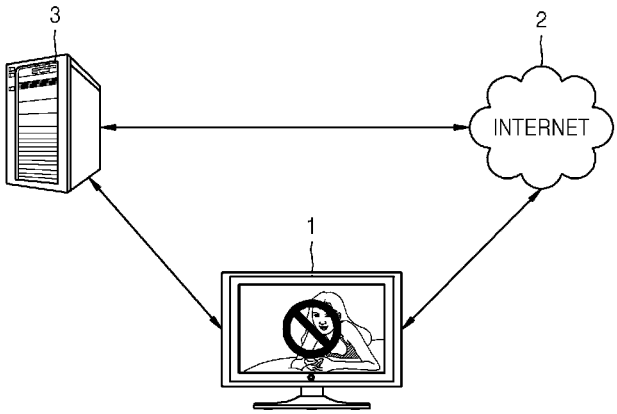
FIG. 2 is a structural diagram of an IPTV broadcasting system according to an exemplary embodiment of the present invention.

FIG. 2 is a structural diagram of an IPTV broadcasting system according to an exemplary embodiment of the present invention.

Referring to FIG. 2, the IPTV broadcasting system according to the current exemplary embodiment of the present invention includes an IPTV 1, a CA information server 3, and the Internet 2.

The IPTV 1 according to the current exemplary embodiment of the present invention is an IP-based TV broadcast receiving and/or displaying device/system and should be understood as a comprehensive concept including broadband TVs and IPTVs.

The IPTV 1 may download and reproduce various multimedia contents existing on the Internet 2, in addition to broadcasting programs which are multicast by IPTV broadcasting stations.

The CA information server 3 according to the current exemplary embodiment of the present invention generates CA information on the various multimedia contents existing on the Internet 2. The generated CA information is transmitted to the IPTV 1 in accordance with a request of the IPTV 1. The CA information server 3 is an independent device that is physically and logically separated from IPTV broadcasting stations or multimedia content producers.

Figure 3:
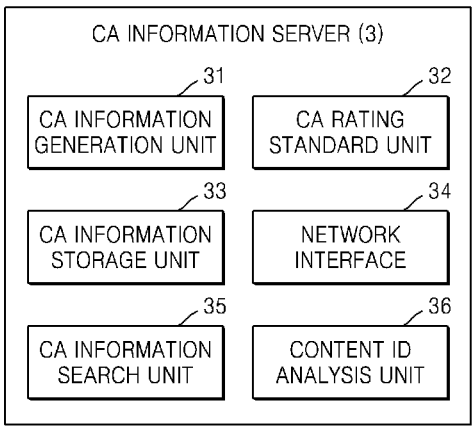
FIG. 3 is a detailed functional block diagram of a CA information server illustrated in FIG. 2, according to an exemplary embodiment of the present invention.

FIG. 3 is a detailed functional block diagram of the CA information server 3 illustrated in FIG. 2, according to an exemplary embodiment of the present invention.

Referring to FIG. 3, the CA information server 3 includes a CA information generation unit 31, a CA rating standard unit 32, a CA information storage unit 33, a network interface 34, a CA information search unit 35, and a content identification (ID) analysis unit 36. The CA rating standard unit 32 stores CA rating information such as information on viewing age restrictions.

Figure 4:
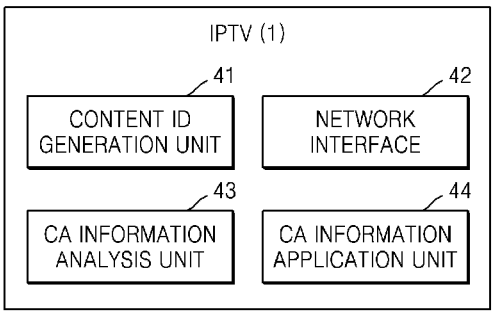
FIG. 4 is a detailed functional block diagram of an IPTV illustrated in FIG. 2, according to an exemplary embodiment of the present invention.

FIG. 4 is a detailed functional block diagram of the IPTV 1 illustrated in FIG. 2, according to an exemplary embodiment of the present invention.

Referring to FIG. 4, the IPTV 1 includes a content ID generation unit 41, a network interface 42, a CA information analysis unit 43, and a CA information application unit 44.

The content ID generation unit 41 according to the current exemplary embodiment of the present invention is used to generate a particular ID of each content. For example, the content ID generation unit 41 may generate a hash value by using data of the content.

The CA information application unit 44 includes preset information about items which the viewer(s) do not like to view (hereinafter referred to as "phobia information"). The phobia information may be directly set by a user or be automatically set by the IPTV 1 trough monitoring a viewing pattern of the user.

Figure 5:
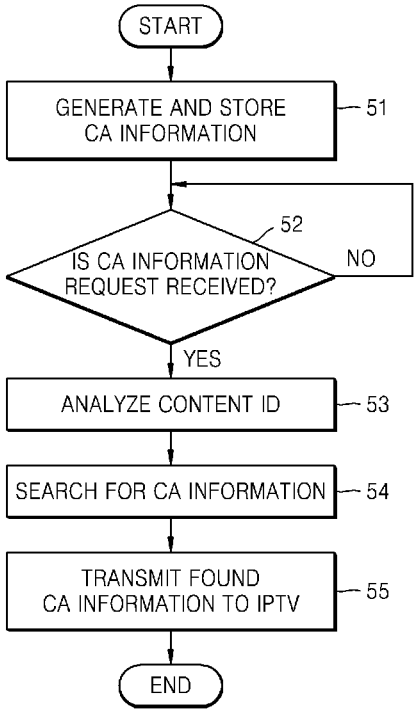
FIG. 5 is a flowchart of a method of generating and providing CA information by using the CA information server illustrated in FIGS. 2 and 3, according to an exemplary embodiment of the present invention.

FIG. 5 is a flowchart of a method of generating and providing CA information by using the CA information server 3 illustrated in FIGS. 2 and 3, according to an exemplary embodiment of the present invention. FIG. 5 will be described in conjunction with FIGS. 2 and 3.

Referring to FIG. 5, initially, in operation 51, the CA information generation unit 31 of the CA information server 3 selects contents not having the CA information from among multimedia contents existing on the Internet 2, and then generates the CA information on the selected contents. In this case, the CA information generation unit 31 may determine details of the CA information to be generated, by referring to the CA rating information stored in the CA rating standard unit 32 or a user's input. According to an exemplary embodiment of the present invention, the CA information generation unit 31 may generate particular IDs (for example, hash values) of the contents in order to uniquely identify each of contents. The generated CA information and the IDs of the contents are stored in the CA information storage unit 33 (operation 51).

Operations 52 through 55 are related to a method of providing the CA information generated and stored by the CA information generation unit 31 in operation 51, to the IPTV 1.

The CA information server 3 receives an ID of a content together with a request for the CA information on the content, from the IPTV 1 through the network interface 34 (operation 52).

The CA information server 3 recognizes the request for the CA information and instructs the content ID analysis unit 36 to analyze the received ID of the content (operation 53).

The CA information search unit 35 searches the CA information storage unit 33 in order to obtain the CA information corresponding to the ID, by referring to an analysis result of the content ID analysis unit 36 (operation 54).

The CA information server 3 transmits the CA information found in operation 54 to the IPTV 1 who has requested for the CA information (operation 55).

Figure 6:
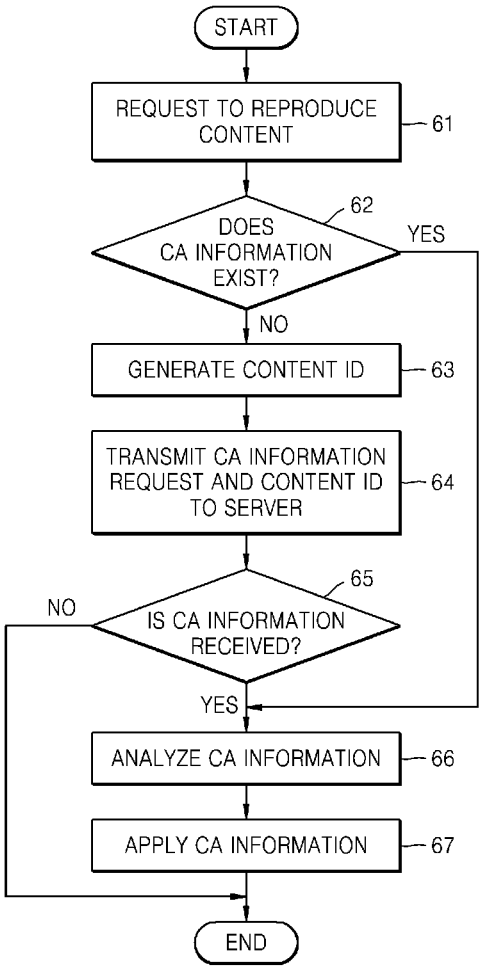
FIG. 6 is a flowchart of a method of using CA information by using the IPTV illustrated in FIGS. 2 and 4, according to an exemplary embodiment of the present invention.

FIG. 6 is a flowchart of a method of using CA information by using the IPTV 1 illustrated in FIGS. 2 and 4, according to an exemplary embodiment of the present invention. FIG. 6 will be described in conjunction with FIGS. 2 through 4.

Referring to FIG. 6, if a user selects a content by using, for example, a remote controller and requests the IPTV 1 to reproduce the selected content (operation 61), the IPTV 1 initially determines whether the CA information is included in a file of the content to be reproduced (operation 62).

If the CA information is included in the file of the content to be reproduced, the IPTV 1 immediately reproduces the content and analyzes/applies the CA information at the same time (operations 66 and 67).

On the other hand, if the CA information is not included in the file of the content to be reproduced, the IPTV 1 initially instructs the content ID generation unit 41 to generate a particular ID of the content to be reproduced. The content ID generation unit 41 generates the particular ID (for example, a hash value) of the content by using data of the content (operation 63).

The IPTV 1 transmits a request for the CA information on the content and the ID of the content, which is generated in operation 63, to the CA information server 3 through the network interface 42.

If the CA information server 3 searches for the requested CA information and transmits the CA information to the IPTV 1 through the network interfaces 34 and 42, in response to the request for the CA information (operation 65), the CA information analysis unit 43 analyzes (for example, parses) the received CA information (operation 66).

Lastly, in operation 67, the CA information application unit 44 applies the CA information based on a parsing result of the CA information analysis unit 43. In more detail, in accordance with CA information, the CA information application unit 44 restricts reproduction of the whole content (for example, restricts viewing of the content) or restricts reproduction of a part of image or speech data to be reproduced.

Figure 7:
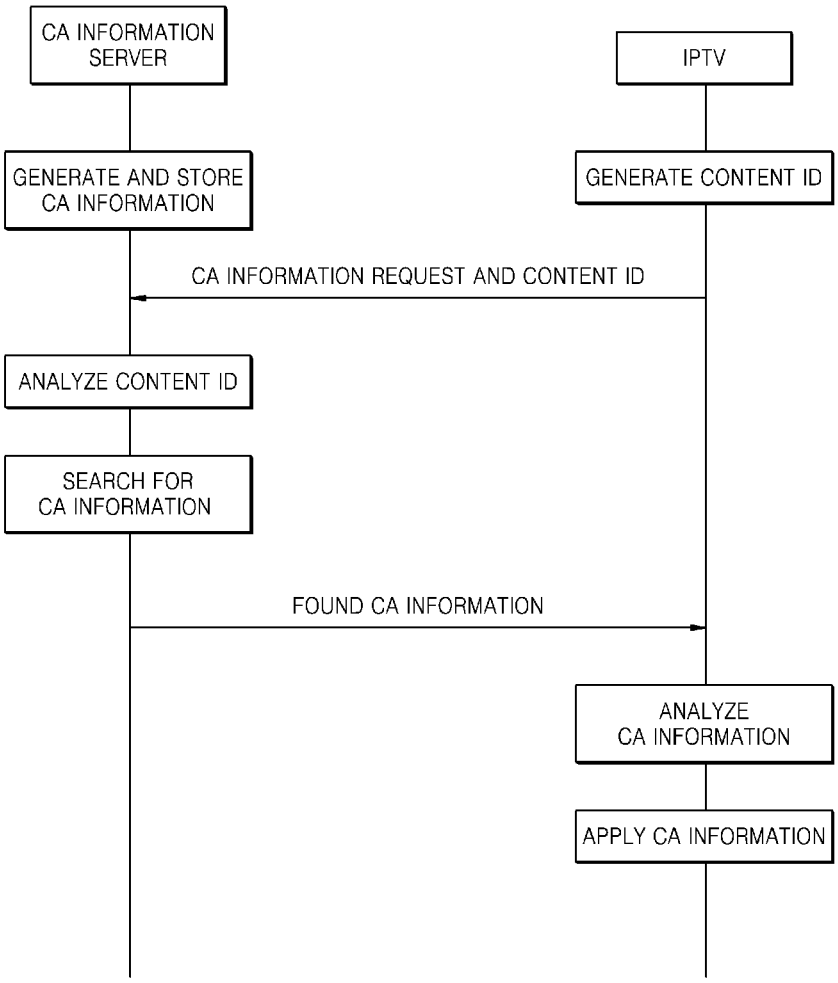
FIG. 7 is a diagram illustrating sequential operations of the methods of FIGS. 5 and 6, for convenience of understanding.

FIG. 7 is a diagram illustrating sequential operations of the methods of FIGS. 5 and 6, for convenience of understanding.

In FIG. 7, left and right vertical lines respectively indicate independent operations of the CA information server 3 illustrated in FIGS. 2 and 3, and the IPTV 1 illustrated in FIGS. 2 and 4, and horizontal lines indicate mutual operations such as information exchange, between the CA information server 3 and the IPTV 1.

FIGS. 8A, 8B, 9, 10, and 11 show various examples of CA information according to exemplary embodiments of the present invention.

Figure 8A:
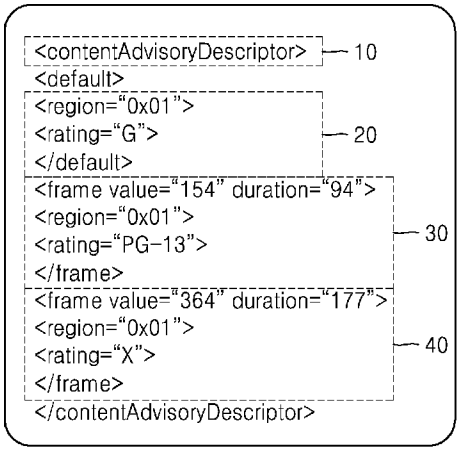
FIG. 8A is a diagram showing a CA descriptor as an example of CA information according to an exemplary embodiment of the present invention.

FIG. 8A is a diagram showing a CA descriptor as an example of CA information according to an exemplary embodiment of the present invention. The CA descriptor is metadata of an extensible markup language (XML) format, and uses a CA rating standard that is defined by the Advanced Television Systems Committee (ATSC).

Referring to FIG. 8A, a first tag portion 10 indicates a beginning of the CA information (or metadata).

A second tag portion 20 of "<default>", if not differently designated, designates a default rating of CA, which is applied to frames included in a broadcasting stream. Here, the default rating is designated as "G".

Figure 8B:
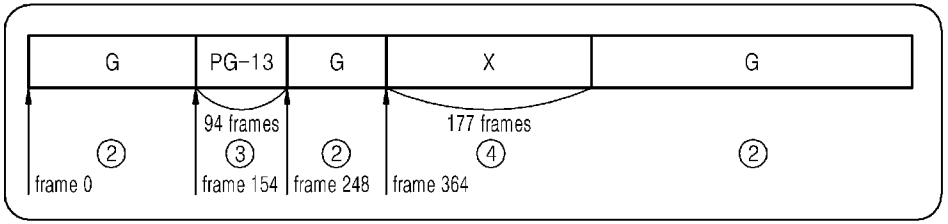
FIG. 8B is a diagram showing variations in ratings of a broadcasting stream in accordance with the CA descriptor shown in FIG. 8A.

Third and fourth tag portions 3 and 4 designate certain frames as other ratings which are not the default rating "G". The third tag portion 30 designates ninety four sequential frames starting with frame No. 154, to have a "PG-13" rating, and the fourth tag portion 40 designates one hundred seventy seven sequential frames starting with a frame No. 364, to have a "X" rating. FIG. 8B is a diagram showing variations in ratings of a broadcasting stream in accordance with the CA descriptor shown in FIG. 8A.

FIG. 9 is a diagram showing a broadband content guide (BCG) into which rating information, that is, a parental guide is inserted, as an example of CA information according to another exemplary embodiment of the present invention.

Referring to FIG. 9, in order to designate a CA rating during a certain segment of a broadcasting program, a "PG-13" rating is designated by adding an "oif:ParentalGuide" element to a description element. MediaRelTimePoint and MediaDuriation of a program to which the "PG-13" rating is applied, are included in a segment locator element. In more detail, the "PG-13" rating is applied during a segment (duration: 23 minutes, 17 seconds) from 20 minutes, 14 seconds to 43 minutes, 31 seconds of the program. Such CA information may be applied to an Optical Internetworking Forum (OIF) standard by adding the CA information to the Digital Video Broadcasting-Internet Protocol (DVB-IP) BCG of the OIF.

FIG. 10 is a diagram showing a CA descriptor for blocking reproduction of portions of a content, which correspond to phobias of the viewer, as an example of CA information according to another exemplary embodiment of the present invention.

Referring to FIG. 10, if the content includes frames on which a "snake" appears, those frames are indicated on a first <phobia> portion 50. Also, if the content includes frames on which "George W. Bush" appears, those frames are indicated on a second <phobia> portion 60.

If "snake" and "George W. Bush" are preset as phobia information of the viewer in the CA information application unit 44 of the IPTV 1 illustrated in FIGS. 2 and 4, the CA information application unit 44 restricts viewing of corresponding frames by blocking reproduction of the frames by referring to the CA descriptor of FIG. 10.

Figure 11:
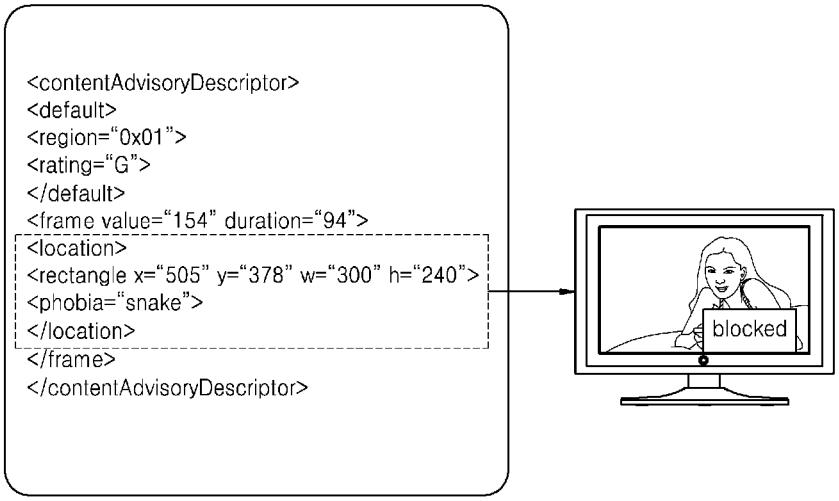
FIG. 11 is a diagram showing a CA descriptor for blocking reproduction of a partial region of a frame (or screen), as an example of CA information according to another exemplary embodiment of the present invention.

FIG. 11 is a diagram showing a CA descriptor for blocking reproduction of a partial region of a frame (or screen), as an example of CA information according to another exemplary embodiment of the present invention.

FIGS. 8A, 8B, 9, and 10 show examples when whole frames are blocked from being reproduced. However, in FIG. 11, only a partial region of a frame is blocked from being reproduced.

Referring to FIG. 11, a tag portion of "<location>" designates x and y coordinates, width, and height of a blocked region and thus a corresponding region indicated as "blocked" is blocked from being reproduced. In FIG. 11, the blocked region has a rectangular shape. However, according to another exemplary embodiment of the present invention, the blocked region may have any other shape. If the blocked region has a circular shape, the CA descriptor may designate as, for example, <circle X="385", y="210", radius="50">.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

As described above, according to the exemplary embodiments of the present invention, CA information on Internet contents is provided in addition to contents transmitted from broadcasting stations and thus viewers may protect themselves from harmful contents on the Internet.

According to the exemplary embodiments of the present invention, CA information is provided in units of frames of the contents and thus more specified CA functions on contents may be performed.

The exemplary embodiments of the present invention use metadata of an XML format and thus, if a user desires, additional CA information may be provided in addition to conventional CA information. Accordingly, a user-customized CA function may be enabled.

The exemplary embodiments of the present invention may create a new commercial service model for generating and providing CA information on Internet contents.

The exemplary embodiments of the present invention provide a possibility to lead standardization in this field by suggesting a new methodology of providing CA information, which may be applied if or when IPTVs become popular in the future.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing content advisory (CA) information, the method comprising:

receiving, at a CA information server, a request for CA information on a content, the request including an identification (ID) of the content, from an Internet Protocol television (IPTV);

searching for CA information on the content corresponding to the ID of the content by using the ID of the content based on the request, at the CA information server; and transmitting the CA information on the content, which is found as a result of the searching, from the CA information server to the IPTV, *the CA information comprising viewing restriction information,* wherein *a reproduction of at least one temporal part of the content corresponding to the CA information is restricted in the IPTV, another temporal part of the content that does not correspond to the CA information is reproduced in the IPTV, and* the CA information server is independent from a server providing the content to the IPTV,

*wherein the content comprises a plurality of temporal parts and the CA information comprises the viewing restriction information in units of the temporal parts of the content,*

*wherein the method further comprises generating the viewing restriction information in the units of the temporal parts of the content,*

*wherein the transmitting the CA information comprises transmitting the CA information comprising the generated viewing restriction information in the units of the temporal parts of the content, and*

*wherein the viewing restriction information comprises, for each of the temporal parts of the content, a frame value identifying a first frame of a corresponding temporal part, and duration information identifying a number of frames in the corresponding temporal part.*

2. The method of claim 1, [wherein the CA information server generates and stores] *further comprising generating and storing*, in advance, CA information on contents for which CA information is not found.

3. The method of claim 1, wherein the searching for the CA information comprises searching for the CA information on the content corresponding to the ID by using the ID of the content.

4. The method of claim 1, wherein the CA information is described in an extensible markup language (XML) format.

5. The method of claim 1, wherein the CA information [is utilized to perform a CA function] *comprises the viewing restriction information* in units of frames of content.

6. The method according to claim 1, wherein the content is selected by a user and the CA information on the content selected by the user is transmitted to the IPTV.

7. A method of using content advisory (CA) information when an Internet Protocol television (IPTV) reproduces a content not having CA information, the method comprising:

transmitting a request for CA information of a content, the request including an [ID] *identification* (*ID*) of the content, from the IPTV to a CA information server;

receiving, *by the IPTV,* the CA information of the content corresponding to the ID of the content from the CA information server [at the IPTV], *the CA information comprising viewing restriction information*;

[analyzing] *determining, by the IPTV, at least one temporal part of the content corresponding to* the CA information [at the IPTV]; [and]

[applying the CA information to reproduction of the content at the IPTV,] *restricting, by the IPTV, reproduction of the determined at least one temporal part of the content; and*

*reproducing another temporal part of the content that does not correspond to the CA information,* wherein the CA information server is independent from a server providing the content to the IPTV, *and*

*wherein the content comprises a plurality of temporal parts and the CA information comprises the viewing restriction information in units of the temporal parts of the content.*

8. The method of claim 7, further comprising determining whether the content to be reproduced by the IPTV has the CA information.

9. The method of claim 8, further comprising generating an identification (ID) of the content if it is determined that the content to be reproduced by the IPTV does not have the CA information.

10. The method of claim 7, wherein the CA information [is utilized to perform a CA function] *comprises the viewing restriction information* in units of frames of the content, *and*

*wherein the determining comprises determining, by the IPTV, the at least one part of the content in units of frames based on the viewing restriction information.*

11. The method of claim 7, wherein the CA information includes information on viewing age restrictions, *and*

*wherein the determining comprises determining, by the IPTV, the at least one part of the content based on the information on viewing age restrictions.*

12. The method of claim 7, wherein the CA information includes information for blocking reproduction of an image corresponding to a viewer phobia, *and*

*wherein the determining comprises determining, by the IPTV, an image of the content based on the information for blocking reproduction of the image corresponding to the viewer phobia.*

13. The method of claim 7, wherein the CA information includes information for blocking reproduction of a partial region of a screen, *and*

*wherein the determining comprises determining, by the IPTV, the partial region of the screen based on the information for blocking reproduction of the partial region of the screen.*

14. A content advisory (CA) information server comprising:

a [CA information storage unit which stores] *storage configured to store* CA information;

[a content identification (ID) analysis unit which analyzes] *at least one computer hardware processor configured to analyze* an [ID] *identification (ID)* of a content requiring the CA information[;] and

[a CA information search unit which searches the CA information storage unit in order] to obtain the CA information of the content corresponding to the ID of the content, by using the ID of the content, in accordance with a request of an Internet Protocol television (IPTV), *the CA information comprising viewing restriction information,* wherein *a reproduction of at least one temporal part of the content corresponding to the CA information is restricted in the IPTV, another temporal part of the content that does not correspond to the CA information is reproduced in the IPTV, and* the CA information server is independent from a server providing the content to the IPTV, *and*

*wherein the content comprises a plurality of temporal parts and the CA information comprises the viewing restriction information in units of the temporal parts of the content, and*

*wherein the least one computer hardware processor is further configured to generate the viewing restriction information in the units of the temporal parts of the content and control to transmit the CA information comprising the generated viewing restriction information in the units of the temporal parts of the content, and*

*wherein the viewing restriction information comprises, for each of the temporal parts of the content, a frame value identifying a first frame of a corresponding temporal part, and duration information identifying a number of frames in the corresponding temporal part.*

15. The CA information server of claim 14, [further comprising a CA rating standard unit which stores] *wherein the storage is configured to store* CA rating information.

[16. The CA information server of claim 14, further comprising a CA information generation unit for generating the CA information on contents not having CA information.]

17. A content advisory (CA) information management system comprising:

a CA information server [which provides] *comprising a first computer-readable recording medium and at least one first computer hardware processor configured to execute instructions stored in the computer-readable recording medium to provide* CA information on a multimedia content corresponding to an identification (ID) of the multimedia content, the multimedia content being provided via the Internet, *the CA information comprising viewing restriction information*; and an Internet Protocol television (IPTV) [which controls] *comprising a second computer-readable recording medium and at least one second computer hardware processor configured to execute instructions stored in the second computer-readable recording medium to restrict* reproduction of the multimedia contents by using the CA information, wherein *the at least one second computer hardware processor is configured to restrict the reproduction by determining at least one temporal part of the content corresponding to the CA information, restricting a reproduction of at the least one temporal part of the content corresponding to the CA information, and reproducing another temporal part of the content that does not correspond to the CA information,*

*wherein* the CA information server is independent from a server providing the content to the IPTV, *and*

*wherein the content comprises a plurality of temporal parts and the CA information comprises the viewing restriction information in units of the temporal parts of the content.*

18. An Internet Protocol television (IPTV) comprising:

[a content ID generation unit which generates an identification (ID) for identifying a content;]

*a communication interface configured to transmit, to a CA information server, a request for CA information of a content, the request including an identification (ID) of the content, and to receive the CA information corresponding to the ID of the content from the CA information server, based on the ID of the content, the CA information comprising viewing restriction information; and*

[a CA information analysis unit which parses] *at least one computer hardware processor configured to parse* the CA information on the content[; and a CA information application unit which performs a CA function by referring to a result of the parsing by the CA information analysis unit], *to determine at least one*

*temporal part of the content corresponding to the CA information, to restrict reproduction of the determined at least one temporal part of the content, and to reproduce another temporal part of the content that does not correspond to the CA information,*

[wherein the IPTV obtains the CA information corresponding to the ID of the content from a CA information server, by using the ID of the content] wherein the CA information server is independent from a server providing the content to the IPTV, *and*

*wherein the content comprises a plurality of temporal parts and the CA information comprises the viewing restriction information in units of the temporal parts of the content.*

19. A computer readable recording medium having recorded thereon a computer program for executing a method of providing content advisory (CA) information, the method comprising:

receiving, at a CA information server, a request for CA information on a content, the request including an identification (ID) of the content, from an Internet Protocol television (IPTV);

searching for CA information on the content corresponding to the ID of the content by using the ID of the content based on the request, at the CA information server; and transmitting the CA information on the content, which is found a result of the searching, from the CA information server to the IPTV, *the CA information comprising viewing restriction information,* wherein *a reproduction of at least one temporal part of the content corresponding to the CA information is restricted in the IPTV, another temporal part of the content that does not correspond to the CA information is reproduced in the IPTV, and* the CA information server is independent from a server providing the content to the IPTV,

*wherein the content comprises a plurality of temporal parts and the CA information comprises the viewing restriction information in units of temporal parts of the content,*

*wherein the method further comprises generating the viewing restriction information in the units of the temporal parts of the content,*

*wherein the transmitting the CA information comprises transmitting the CA information comprising the generated viewing restriction information in the units of the temporal parts of the content, and*

*wherein the viewing restriction information comprises, for each of the temporal parts of the content, a frame value identifying a first frame of a corresponding temporal part, and duration information identifying a number of frames in the corresponding temporal part.*

20. A computer readable recording medium having recorded thereon a computer program for executing a method of using content advisory (CA) information when an Internet Protocol television (IPTV) reproduces a content not having the CA information, the method comprising:

transmitting a request for CA information of a content, the request including an ID of the content, from the IPTV to a CA information server;

receiving the CA information of the content corresponding to the ID of the content from the CA information server at the IPTV, *the CA information comprising viewing restriction information*;

[analyzing] *determining at least one temporal part of the content corresponding to* the CA information at the IPTV; [and applying the CA information to reproduction of the content at the IPTV,] *restricting, by the IPTV, reproduction of the determined at least one temporal part of the content; and*

*reproducing another temporal part of the content that does not correspond to the CA information,* wherein the CA information server is independent from a server providing the content to the IPTV, *and*

*wherein the content comprises a plurality of temporal parts and the CA information comprises the viewing restriction information in units of the temporal parts of the content.*

*21. A method of providing content advisory (CA) information of a content to a client device, by a CA information server, the method comprising:*

*receiving, at the CA information server, a request for the CA information on a content, the request including an identification (ID) of the content, from the client device;*

*searching for the CA information on the content corresponding to the ID of the content by using the ID of the content based on the request, at the CA information server; and*

*transmitting the CA information on the content, which is found as a result of the searching, from the CA information server to the client device, the CA information comprising viewing restriction information,*

*wherein a reproduction of at least one temporal part of the content corresponding to the CA information is restricted in the client device, another temporal part of the content that does not correspond to the CA information is reproduced in the client device, and the CA information server is independent from a server providing the content to the client device,*

*wherein the content comprises a plurality of temporal parts and the CA information comprises the viewing restriction information in units of the temporal parts of the content,*

*wherein the method further comprises generating the viewing restriction information in the units of the temporal parts of the content,*

*wherein the transmitting the CA information comprises transmitting the CA information comprising the generated viewing restriction information in the units of the temporal parts of the content, and*

*wherein the viewing restriction information comprises, for each of the temporal parts of the content, a frame value identifying a first frame of a corresponding temporal part, and duration information identifying a number of frames in the corresponding temporal part.*

*22. The method of claim 21, further comprising generating and storing, in advance, CA information on contents for which CA information is not found.*

*23. The method of claim 21, wherein the searching for the CA information comprises searching for the CA information on the content corresponding to the ID by using the ID of the content.*

*24. The method of claim 21, wherein the CA information is described in an extensible markup language (XML) format.*

*25. The method of claim 21, wherein the CA information comprises the viewing restriction information in units of frames of content.*

*26. A method of using content advisory (CA) information when a client device reproduces a content, the method comprising:*

*transmitting a request for CA information of a content, the request including an ID of the content, from the client device to a CA information server;*

*receiving, by the client device, the CA information of the content corresponding to the ID of the content from the CA information server, the CA information comprising viewing restriction information;*

*determining, by the client device, at least one temporal part of the content corresponding to the CA information;*

*restricting, by the client device, reproduction of the determined at least one temporal part of the content and*

*reproducing another temporal part of the content that does not correspond to the CA information,*

*wherein the CA information server is independent from a server providing the content to the client device, and*

*wherein the content comprises a plurality of temporal parts and the CA information comprises the viewing restriction information in units of the temporal parts of the content.*

*27. The method of claim 26, further comprising determining whether the content to be reproduced by the client device has the CA information.*

*28. The method of claim 27, further comprising generating an identification (ID) of the content if it is determined that the content to be reproduced by the client device does not have the CA information.*

*29. The method of claim 26, wherein the CA information comprises the viewing restriction information in units of frames of the content, and*

*wherein the determining comprises determining, by the client device, the at least one part of the content in units of frames based on the viewing restriction information.*

*30. The method of claim 26, wherein the CA information includes information on viewing age restrictions, and*

*wherein the determining comprises determining, by the client device, the at least one part of the content based on the information on viewing age restrictions.*

*31. The method of claim 26, wherein the CA information includes information for blocking reproduction of an image corresponding to a viewer phobia, and*

*wherein the determining comprises determining, by the client device, an image of the content based on the information for blocking reproduction of the image corresponding to the viewer phobia.*

*32. The method of claim 26, wherein the CA information includes information for blocking reproduction of a partial region of a screen, and*

*wherein the determining comprises determining, by the client device, the partial region of the screen based on the information for blocking reproduction of the partial region of the screen.*

*33. A content advisory (CA) information server comprising:*

*a storage configured to store CA information;*

*at least one computer hardware processor configured to analyze an identification (ID) of a content requiring the CA information and to obtain the CA information of the content corresponding to the ID of the content, by using the ID of the content, in accordance with a request of a client device, the CA information comprising viewing restriction information,*

*wherein a reproduction of the at least one temporal part of the content corresponding to the CA information is restricted in the client device, another temporal part of the content that does not correspond to the CA information is reproduced in the client device, and the CA information server is independent from a server providing the content to the client device,*

*wherein the content comprises a plurality of temporal parts and the CA information comprises the viewing restriction information in units of the temporal parts of the content,*

*wherein the least one computer hardware processor is further configured to generate the viewing restriction information in the units of the temporal parts of the content and control to transmit the CA information comprising the generated viewing restriction information in the units of the temporal parts of the content, and*

*wherein the viewing restriction information comprises, for each of the temporal parts of the content, a frame value identifying a first frame of a corresponding temporal part, and duration information identifying a number of frames in the corresponding temporal part.*

*34. The CA information server of claim 33, wherein the storage is further configured to store CA rating information.*

*35. A client device comprising:*

*a communication interface configured to transmit a request to a CA information server for CA information of a content, the request including an identification (ID) of the content and to receive the CA information corresponding to the ID of the content from the CA information server, based on the ID of the content, the CA information comprising viewing restriction information; and*

*at least one computer hardware processor configured to determine at least one temporal part of the content corresponding to the CA information, to restrict reproduction of the determined at least one temporal part of the content, and to reproduce another temporal part of the content that does not correspond to the CA information,*

*wherein the CA information server is independent from a server providing the content to the client device, and*

*wherein the content comprises a plurality of temporal parts and the CA information comprises the viewing restriction information in units of the temporal parts of the content.*

*36. A computer readable recording medium having recorded thereon a computer program for executing a method of using content advisory (CA) information of a content provided to a client device by a CA information server, the method comprising:*

*receiving, at the CA information server, a request for the CA information on a content, the request including an identification (ID) of the content, from a client device;*

*searching for the CA information on the content corresponding to the ID of the content by using the ID of the content based on the request, at the CA information server; and*

*transmitting the CA information on the content, which is found a result of the searching, from the CA information server to the client device, the CA information comprising viewing restriction information,*

*wherein a reproduction of at least one temporal part of the content corresponding to the CA information is restricted in the client device, another temporal part of the content that does not correspond to the CA information is reproduced in the client device, and the CA*

*information server is independent from a server providing the content to the client device,*

*wherein the content comprises a plurality of temporal parts and the CA information comprises the viewing restriction information in units of the temporal parts of the content,*

*wherein the method further comprises generating the viewing restriction information in the units of the temporal parts of the content,*

*wherein the transmitting the CA information comprises transmitting the CA information comprising the generated viewing restriction information in the units of the temporal parts of the content, and*

*wherein the viewing restriction information comprises, for each of the temporal parts of the content, a frame value identifying a first frame of a corresponding temporal part, and duration information identifying a number of frames in the corresponding temporal part.*

*37. A computer readable recording medium having recorded thereon a computer program for executing a method of using content advisory (CA) information when a client device reproduces a content not having the CA information, the method comprising:*

*transmitting a request for the CA information of a content, the request including an identification (ID) of the content, from the client device to a CA information server;*

*receiving the CA information of the content corresponding to the ID of the content from the CA information server at the client device, the CA information comprising viewing restriction information;*

*determining, by the client device, at least one temporal part of the content corresponding to the CA information;*

*restricting, by the client device, reproduction of the determined at least one temporal part of the content; and*

*reproducing another temporal part of the content that does not correspond to the CA information,*

*wherein the CA information server is independent from a server providing the content to the client device, and*

*wherein the content comprises a plurality of temporal parts and the CA information comprises the viewing restriction information in units of the temporal parts of the content.*

*38. The method according to claim 21, wherein the content is selected by a user and the CA information on the content selected by the user is transmitted to the client device.*

* * * * *